United States Patent [19]

Giacometti et al.

[11] Patent Number: 4,611,324
[45] Date of Patent: Sep. 9, 1986

[54] METHOD OF CONTROLLING A SUPERVISORY ARRANGEMENT IN A DIGITAL TRANSMISSION SYSTEM

[75] Inventors: Alberto M. Giacometti; Hans Gruijs; Coos DeVries, all of Hilversum, Netherlands

[73] Assignee: U.S. Philips Corporation, New York, N.Y.

[21] Appl. No.: 669,279

[22] Filed: Nov. 7, 1984

[30] Foreign Application Priority Data

Nov. 17, 1983 [NL] Netherlands ............ 8303944

[51] Int. Cl.⁴ ............ H04B 3/36; H04B 3/46; H04J 3/00
[52] U.S. Cl. ............ 370/97; 370/13; 370/15; 370/14; 179/170 F; 179/175.31 R
[58] Field of Search ............ 370/97, 13, 17, 15, 370/14; 179/170 F, 175.31 R; 340/825.06, 825.52; 371/22

[56] References Cited

U.S. PATENT DOCUMENTS

| | | | |
|---|---|---|---|
| 3,731,203 | 5/1973 | Lieberman | 179/175.31 R |
| 4,022,988 | 5/1977 | Lentz et al. | 371/22 |
| 4,161,635 | 7/1979 | Wolaver | 179/175.31 R |
| 4,270,029 | 5/1981 | Sato et al. | 179/175.31 R |

Primary Examiner—Douglas W. Olms
Assistant Examiner—Wellington Chin
Attorney, Agent, or Firm—Thomas A. Briody; William J. Streeter; Edward W. Goodman

[57] ABSTRACT

A supervisory arrangement for a digital transmission system in which a plurality of repeaters are arranged between two terminal stations, a terminal station transmitting a call message which is provided with an address number towards the desired repeater. In each repeater passed-through the received address number is increased by a fixed number, for example 1, and thereafter compared with another fixed number, for example 0. The repeater which detects that the increased address number received is equal to the other fixed number, transmits its service information towards at least one terminal station. This accomplishes that all said repeaters may be of an identical construction.

3 Claims, 3 Drawing Figures

METHOD OF CONTROLLING A SUPERVISORY ARRANGEMENT IN A DIGITAL TRANSMISSION SYSTEM

BACKGROUND OF THE INVENTION

The invention relates to a method of controlling a supervisory arrangement in a digital transmission system in which a plurality of repeaters are arranged between two terminal stations, a call message including an address number being transmitted by a terminal station towards the desired repeater. In addition, the invention relates to a supervisory arrangement for performing the method.

In digital transmission systems, repeaters must be used between two terminal stations. When bi-directional transmission between these terminal stations is used, these repeaters comprise a regenerator for the forward transmission and a regenerator for the return transmission. These regenerators serve, on the one hand, for pulse regeneration of the transmission signal and, on the other hand, for equalization of the transfer characteristic which in many cases is determined by a cable and is a function of the distance between two consecutive repeaters and of the ambient temperature.

In the terminal stations of the digital transmission system, supervisory arrangements are provided which check whether the digital transmission signals are disturbed, or not. After a disturbance has been detected, the individual repeaters, and consequently also the cable between these repeaters, are checked from a locating terminal station.

The European Patent Application No. 0,029,108 discloses such a supervisory arrangement. The method of controlling this arrangement is as follows. From a terminal station, a first switching pulse is conveyed to the first regenerator which causes the loop between the repeater for the forward transmission and the regenerator for the return transmission to be closed. Simultaneously, the first repeater conveys a signal to a second repeater, in response to which this second repeater is adjusted to a preparatory state. After the first repeater has been tested, the terminal station transmits a second switching pulse which causes the loop closure of the first repeater to be eliminated and the loop between the regenerator for the forward transmission and the regenerator for the return transmission in the second repeater to be closed. The second repeater supplies a signal which adjusts the third repeater to a preparatory state. In similar manner each subsequent switching pulse effects in a subsequent repeater loop closure between the regenerators for the forward and the return transmissions, while the next repeater is adjusted to a preparatory state.

The method of controlling the prior art supervisory arrangement has the disadvantage that the link must be put out of service during testing of the repeaters. A further disadvantage is that the repeaters can only be tested sequentially. So separate, random testing of individual repeaters is not possible. In addition, the position of a repeater is determined from the number of switching pulses transmitted by the terminal station. There is, however, no possibility to check whether this method of location operates correctly, so that incorrect conclusions may be drawn as regards the location of defective repeaters.

SUMMARY OF THE INVENTION

The invention has for its object to provide a solution of the above-mentioned problems and is characterized in that the address number is equal to $B-N.A$, wherein B and A are fixed numbers and N is equal to the number of repeaters located between the terminal station and the desired repeater, the address number being increased by the number A in each repeater passed through and it being checked in that repeater whether the received address number is equal or unequal to B, whereafter, when there is inequality the increased address number is conveyed together with the call message of the terminal station to the subsequent repeater, and whereafter if there is equality, the address number C, wherein C is defined by the relation $C+M.A \neq B$, wherein M is any positive integer and is not greater than the maximum number of repeaters in the link between two terminal stations, and the service information of the relevant repeater is conveyed towards at least one terminal station.

The supervisory arrangement for performing the method according to the invention, wherein a series arrangement of a supervising signal receiver, a first control circuit and a signal supervising transmitter is provided between the input and the output of each repeater, the control circuit having a first terminal for receiving service information from the relevant repeater, is characterized in that an input of the control circuit is connected to the input of a demultiplexer a first output of which is coupled to a first input of a changeover switch and a second output of which is connected to both an input of an adder circuit and an input of a comparison circuit, the fixed number A being added in the adder circuit to the address number and the received address number being compared in the comparator circuit with the number B, an output of the adder circuit being connected to a second input of the change-over switch, an output of the comparator circuit being connectable to a control circuit of the change-over switch via a connecting means, a third input of the change-over switch being connected to said terminal of the control circuit and a fourth input of the change-over switch being connected to a number generator supplying the third fixed number C, the control circuit supplying such a control signal that when the address number is equal to B the third and fourth inputs of the change-over switch are coupled to its output and that, when the address number is equal to B the first and second inputs of the changeover switch are coupled to its outputs, the outputs of the change-over switch being coupled to the output of the control circuit via a multiplexer.

DESCRIPTION OF THE DRAWINGS

The invention will now be described by way of example with reference to the accompanying drawings.

DESCRIPTION OF THE PREFERRED EMBODIMENT

Figure 1:
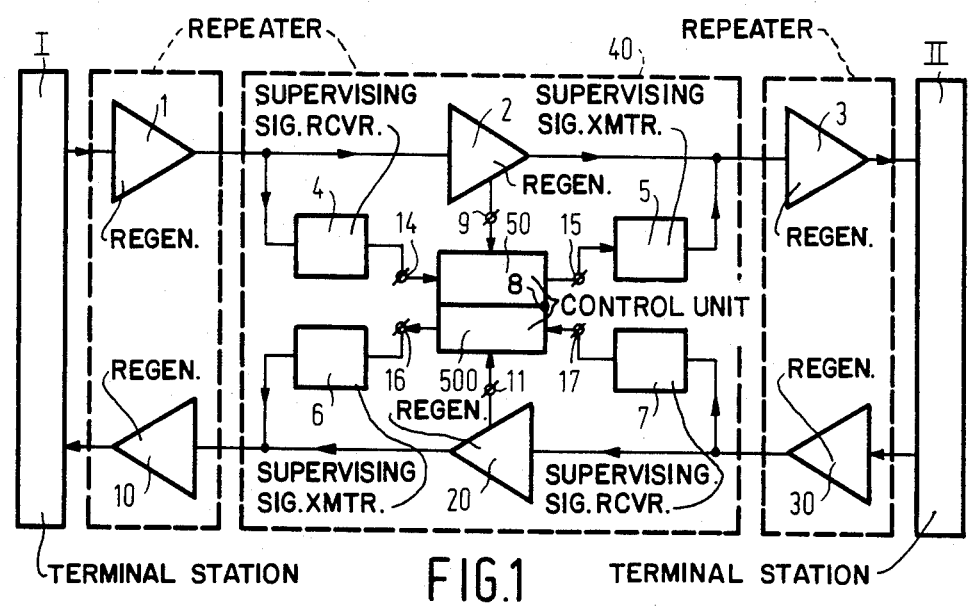
FIG. 1 shows an embodiment of a supervisory arrangement according to the invention.

In the embodiment shown in FIG. 1, reference numerals I and II denote terminal stations between which three repeaters (1, 10), 40 and (3, 30) are located. A detailed structure is shown only of the repeater 40. It will be obvious that the repeaters (1, 10) and (3, 30) may be of an identical construction. In the repeater 40, reference numeral 2 denotes a regenerator which provides regeneration of the forward transmission channels from the terminal station I to the terminal station II and reference numeral 20 denotes a regenerator which provides regeneration of the return transmission channels from the terminal station II to the terminal station I. The input of the regenerator 2 is connected to the input of a supervising signal receiver 4, which receiver detects the supervising signals from the forward transmission channels. The supervising signals are constituted by, for example, digital signals which are amplitude-modulated on the main transmission signal as described, for example, in Netherlands Patent Application No. 82,00,002. The output of the supervising signal receiver 4 is connected to the input 14 of the control unit 8. The output 15 of the control unit 8 is connected to the input of the supervising signal transmitter 5, whose output is connected to the output of the regenerator 2. The input 9 of the control unit 8 is connected to the regenerator 2 for receiving the supervisory information from this regenerator 2, which information is, for example, in the form of error pulses, alarms, etc. The input of the regenerator 20 is connected to the input of the supervising signal receiver 7, which receiver detects the supervising signals from the return transmission channels. The output of the supervising signal receiver 7 is connected to the input 17 of the control unit 8. The output 16 of the control unit 8 is connected to the input of the supervising signal transmitter 6, whose output is connected to the output of the regenerator 20. The input 11 of the control unit 8 is connected to the regenerator 20 for receiving supervising information from this regenerator 20, which information is, for example, in form of error pulses, alarms, etc.

In an arrangement according to the invention, the supervising signals are in the form of messages which mainly comprise an address number and a data portion. The data portion of a supervising message includes the information about the proper operation of a specific repeater, as described in, for example, Philips Telecommunication Review, vol. 37, No. 3, pages 156 to 158. The address number has for its object to identify the data source. By means of known techniques, electric signals can be generated which contain the supervising information. In addition, depending on the circumstances, analog or digital signals may be used for the transmission of the supervising information. These signals are processed in the control unit 8 which is formed from two identical portions 50 and 500 which are used to process signals in the directions indicated as I-II and II-I, respectively in the embodiment of FIG. 1.

Figure 2:
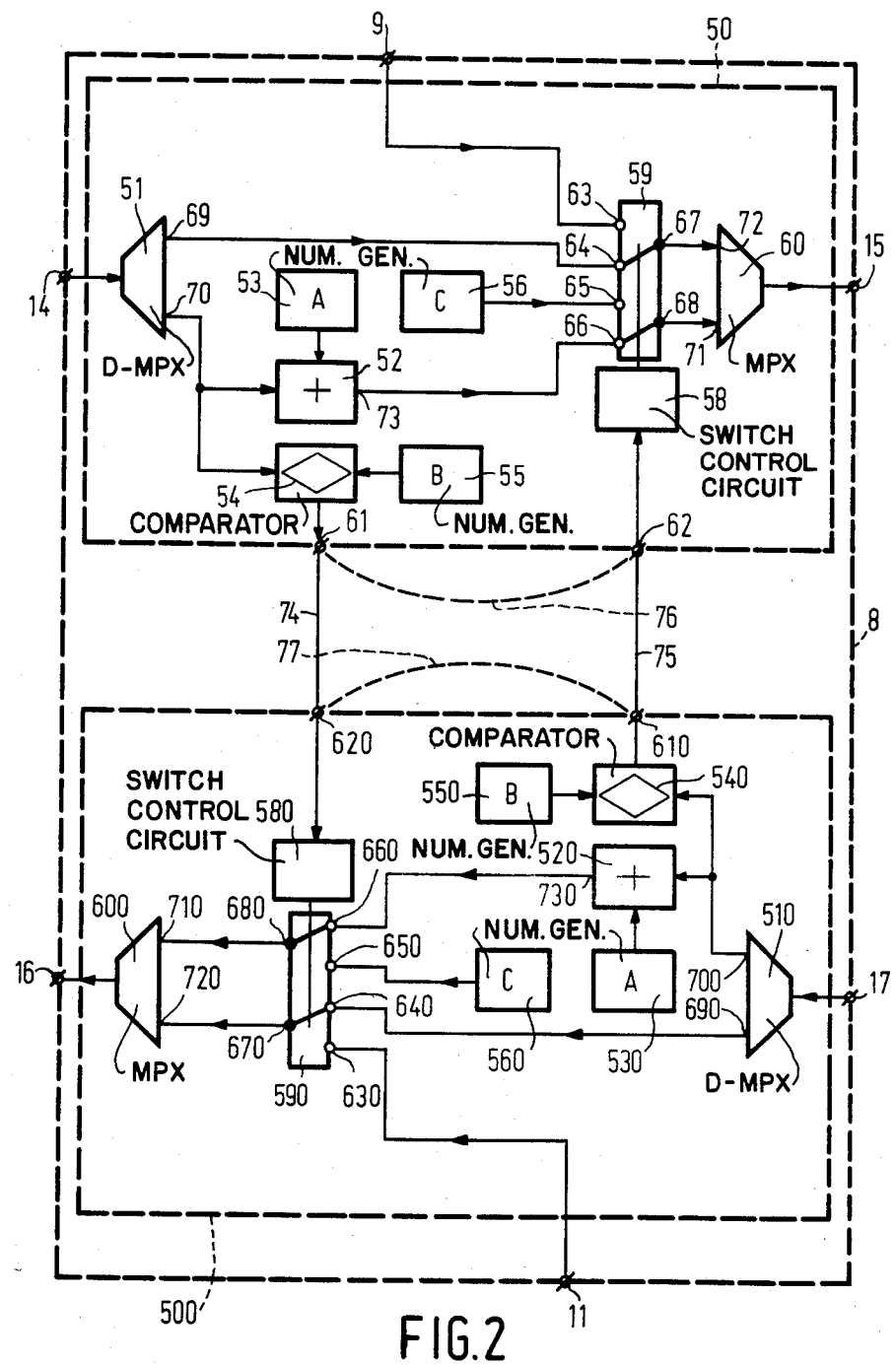
FIG. 2 shows a possible construction of the control unit 8 of the embodiment shown in FIG. 1.

A possible embodiment of the control unit 8 is shown in FIG. 2. The signal input 14 of the control unit 8 is connected to a input of the signal demultiplexer 51, one output 69 of which is connected to a switching contact 64 of a double-pole, change-over switch 59 and the other output 70 of which is connected to an input of an adder circuit 52 and also to an input of a comparator circuit 54. A further input of the adder circuit 52 is connected to a number generator 53. The output 73 of the adder circuit 52 is connected to a switching contact 66 of the double-pole change-over switch 59. The other input of the comparator circuit 54 is connected to a number generator 55. The output of the comparator circuit 54 is connected to the output 61 of the control circuit 50. Service information from the regenerator 2 can be applied to the first terminal 9 of the control unit 8, which terminal 9 is connected to a switching contact 63 of the double-pole change-over switch 59. A number generator 56 is connected to the switching contact 65 of the double-pole change-over switch 59. The two master contacts 67 and 68 of the double-pole change-over switch 59 are connected to inputs 72 and 71, respectively, of a signal multiplexer 60, whose output is connected to the output 15 of the control unit 8. The double-pole change-over switch 59 is controlled by a control circuit 58 which is connected to an input 62 of the control circuit 50. The structure of the lower control circuit 500 is absolutely identical to the structure of the control circuit 50, with the exception that a 0 is added to each reference numeral. The signal input 17 of the control unit 8 is connected to the input of the signal demultiplexer 510. The output of the multiplexer 600 is connected to the output 16 of the control unit 8 and service information from the regenerator 20 can be applied to the input 11 of the control unit 8.

The supervising signal is applied to the signal input 14 of the control unit 8. The signal demultiplexer has for its object to recover the address number and the data information from the incoming signal. The address number is then available at the output 70 and the data information at the output 69 of the demultiplexer 51. The adder circuit 52 has for its object to increase the number representing the address by a fixed number A which is stored in the number generator 53. The increased address number is then available at the output 73 of the adder circuit 52. The comparator circuit 54 compares the address number coming from the output 70 of the signal demultiplexer 51 with a fixed number supplied by the number generator 55. When the two numbers are equal, a control signal is generated and applied to the control output 61 of the control circuit 50.

When the change-over switch 59 is in the position shown in FIG. 2, the increased address coming from the adder circuit 52 and the data information coming from the output 69 of the signal demultiplexer 51 are applied to the multiplexer 60. When the change-over switch 59 is in the other position, a fixed address number, supplied by the number generator 56, and the data information coming from the terminal 9 are applied to the multiplexer 60. In the signal multiplexer 60, the address number and the data information are combined and an electric signal corresponding therewith is generated and applied to the signal output 15 of the control unit 8. The change-over switch 59 is controlled by the control circuit 58 which determines the position of the switch 59 in dependence on a control signal applied via the control input 62. The contents of the number generators 53, 55 and 56, respectively, are the same for all repeaters, so that all the repeaters are of an identical construction.

The supervising arrangement shown in FIG. 1 operates as follows. Let it be assumed that the supervising data can be requested from the repeater containing the regenerator 30 by the station I. The station I transmits a message to the first repeater (1, 10) in the transmission direction I-II. This message contains as the address information a number which depends on the number of repeaters present between the requesting station I and the requested regenerator. This address number is equal to:

$$\text{address} = B - N \times A,$$

wherein N is the number of repeaters between the requesting station and the requested regenerator; A and B, respectively, are the content of the respective number generators 53 and 55. When the regenerator 30 is requested, the call message consequently contains the address B−2×A. This message is processed by the control circuit 50 of the repeater (1, 10). First, the comparator circuit 54 finds that the address number is not equal to B and consequently no control signal is generated. Secondly, the address number is increased by A by the adder circuit 52 and applied to the signal multiplexer 60. The original data portion is also applied to the signal multiplexer 60 and the resultant supervising message is conveyed to the subsequent repeater 40 containing regenerator 2, where the above procedure is repeated. Summarizing, the address contains:

B−2×A: after the station I
B−A: after the repeater (1, 10)
B: after the repeater 40

A supervising message comprising the address number B is consequently received by the repeater (3, 30) and further processed in this repeater by the control circuit 50. Here, the comparator circuit 54 detects that the address number is equal to the content of the number generator 55. This comparator circuit 54 generates a control signal which is applied to the control circuit 580 of the repeater 30 via the connection 74. The presence of this control signal at the input 620 of the control circuit 580 results in the double-pole change-over switch 590 being switched, so that the connections 650-680 and 630-670, respectively, are established. The content C of the number generator 560 and service information present at the terminal 11 are applied to the signal multiplexer 600 which supplies a message which, as its address, contains the number C and as data contains the information about the operation of the regenerator 30. This message is transmitted towards station I to the next repeater 40, whereafter the change-over switch 590 is returned to its original position. The message supplied by the repeater (3, 30) is processed in an identical way by the repeaters 40 and (1, 10). If the fixed number C is chosen such that the condition $$C+M\times A \neq B$$

is satisfied, wherein M is any positive integer, not more than equal to the maximum number of repeaters in a link between the two stations I and II, then no control signal is generated in the repeaters 40 and (1, 10). In the example chosen, the supervising message contains the address C+A after repeater 40
C+2A after repeater (1, 10)

Generally, when N repeaters are arranged between the receiving station and the source of the message, the address will be C+N×A. i.e. N=2 in the case chosen. By subtracting the fixed number C from the received address and by dividing the result by the fixed number A, it is possible to derive in the station I the number of repeaters present between the station and the data source. This determines accurately the position. It is simple to check whether the position has been determined correctly. This can be effected by preserving the address (B−N.A) of the call transmitted by the station I and adding it to the address (C+N×A) of the message received by station I as a reply. The sum is always equal to (B+C), when the location is correctly determined.

The supervisory arrangement shown in FIG. 1 can, for example, be used such that the two terminal stations I and II alternately request and receive the data from the repeaters in the transmission directions I→II and II→I. Station I then sends a sequence of call messages to the first repeater (1, 10) and these messages are arranged such that first, the repeater (1, 10) is operated, then the repeater 40, and soon. As so on as the last repeater has been energized, the subsequent message will reach the station II having as its address the number B. Receiving this message signifies for the station II that all the repeaters in the direction I→II have been energized and also that all the repeaters in these direction II→I have sent their reply to station I. In different, obvious manners, it can now be effected that station I stops and station II starts sending call messages. Now the repeaters (3, 30), 40, etc. are operated until the last repeater in the sequence. Subsequent thereto, a message containing the number B as its address will reach station I and this station will be operated again. The described sequence of events is continuously repeated, which accomplishes that the stations I and II alternately supervise the intermediate repeaters.

In the above-described operating mode, the call messages are transmitted by a station and the replies are received again by the same station by means of closure of the loop. It is, however, alternatively possible for the call messages to be transmitted by a station, while the replies are received and supervised by a subsequent station. This method is therefore also suitable for use in transmission systems having only one transmission path between two stations.

Let it be assumed that the regenerator 3 is called. Station I then sends a message to the repeater (1, 10) with an address number (B−2A). Each time this address passes through a repeater, it is increased by an amount A. The repeater (3, 30) then receives a message having an address number B. The comparator circuit 54 then finds that the address number is equal to the content of the number generator 55 and generates a control signal which is applied to the control circuit 58 via a connection 76. In response thereto, the double-pole change-over switch 59 is switched, so that the connections 65-68 and 63-67, respectively, are established. The content of the number generator 56 and the service information present at terminal 9 are then applied to the multiplexer 60. The multiplexer generates a message which has as its address the number C and as data the information about the operation of the repeater 3. This message is conveyed to station II, whereafter the switch 59 is returned to its original position.

Generally, the address of the message received by station II will be the same as C+N×A, wherein N is the number of repeaters between the receiving station II and the energized repeater. By subtracting in the station II the fixed number C from the received address and by dividing the result by the fixed number A, the number of repeaters between the station II and the origin of the data can be derived. In the above-described example, N=0.

Figure 3:
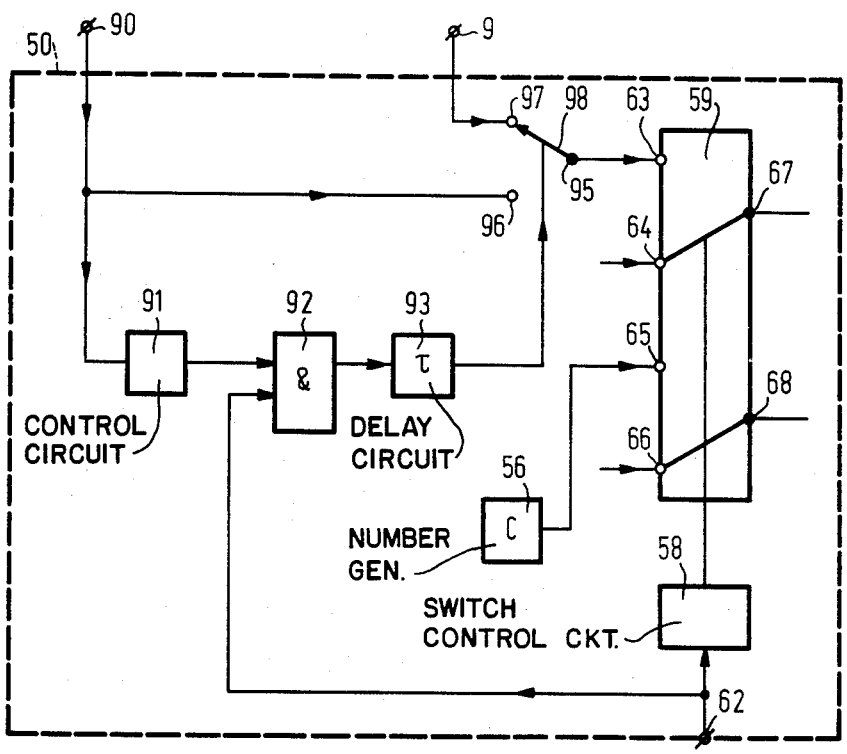
FIG. 3 shows an embodiment of a control circuit suitable for processing alarm information.

The supervisory arrangement described can be adapted in a simple way to the transmission of alarm signals. This has the advantage that no separate alarm transmission system is required, which means a savings in cost. To that end, the control circuit 50 of FIG. 2 is provided with a second terminal 90, to which alarm signals, if any, are applied. This is illustrated in FIG. 3. The terminal 90 is connected to the input of a control circuit 91 and also to a switching contact 96 of a switch 98. The output of the control circuit 91 is connected to an input of an AND-gate 92. A second input of the gate 92 is connected to the input of the control circuit 58 which controls the double-pole switch 59. The output of the gate 92 is coupled to the switch 98 via a delay circuit 93. The terminal 9 for the service information of the relevant regenerator is connected to the switching contact 97 of the switch 98. In all other respects, the construction of control unit 50 is the same as the construction described with reference to FIG. 2.

When no alarm information is applied to the terminal 90, the voltage at the terminal 90 is constant and the control circuit 91 supplies a logic 0. In that case, the operation of the control circuit 50 is the same as described in the foregoing with reference to FIG. 2. When alarm information is applied to the terminal 90 a logic 1 is supplied by the control circuit 91. Now, as soon as a logic 1 is applied to the terminal 62 the service information present at terminal 9 is conveyed further together with the address number. After a time $\tau$, equal to the time delay of the circuit 93, the switch 98 is switched. In that case the master contact 95 is connected to the terminal 90 and the alarm information is now conveyed further, together, or not together, with the address number C.

What is claimed is

1. A supervisory arrangement in a digital transmission system in which a plurality of repeaters are arranged between two terminal stations, wherein a call message including an address number is transmitted by one of said terminal stations to one of said repeaters for verifying the operation thereof, said address number being equal to $B-N \times A$, where B and A are constants and N is equal to the number of repeaters between said one terminal station and said one repeater, wherein said supervisory arrangement comprises a series arrangement of a supervising signal receiver for receiving a call message, a first control circuit and a supervising signal transmitter, said series arrangement being provided between an input and an output of each repeater, the control circuit having a first terminal for receiving service information from the respective repeaters, characterized in that the control circuit comprises a demultiplexer coupled to an output of said supervising signal receiver, a change-over switch having a first input coupled to a first output of said demultiplexer, an adder circuit having a first input coupled to a second output of said demultiplexer for receiving an address number contained in said call message received by said supervising signal receiver, a first number generator for generating the constant A coupled to a second input of said adder, an output of said adder being coupled to a second input of said change-over switch, a comparator having a first input coupled to said second output of said demultiplexer, a second number generator for generating the constant B coupled to a second input of said comparator, a switch control circuit for controlling said change-over switch having a control input selectively coupled to an output of said comparator, said first terminal being coupled to a third input of said change-over switch, a third number generator for generating a constant C, in which C is defined by the relationship $C+M \times A = B$, where M is any positive integer not greater than the number of repeaters in said transmission system, said third number generator being coupled to a fourth input of said change-over switch, and a multiplexer coupled to outputs of said change-over switch, an output of said multiplexed being coupled to said supervising signal transmitter, whereby when the received address number is not equal to the constant B, the switch control circuit causes the change-over switch to couple the first input thereof and the second input, carrying the received address number incremented by A, to the outputs thereof, while, when the received address number is equal to the constant B, the switch control circuit causes the change-over switch to couple the third input thereof, carrying the service information from the first terminal of the control circuit, and the fourth terminal thereof, carrying the constant C which represents a new address number, to the outputs thereof, wherein the address C may be used by one of said terminal stations to identify the repeater supplying the service information.

2. A supervisory arrangement as claimed in claim 1, comprising a second control circuit whose construction is the same as the construction of the control circuit, characterized in that the output of the comparator circuit of the control circuit is connectable to the control input of the switch control circuit for the change-over switch of the second control circuit and that the output of the comparator circuit of the second control circuit is connectable to the control input of the switch control circuit for the change-over switch of the control circuit.

3. A supervisory arrangement as claimed in claim 1, characterized in that the first control circuit (50) has a second terminal (90) for receiving alarm signals, this terminal (90) being connected to an input of an alarm circuit (91) and also to a first switching contact (96) of a switch (98) whose second switching contact (97) is connected to a first output (69) of the demultiplexer (51) and whose master contact (95) is connected to the third input (63) of the change-over switch (59), an output of the alarm circuit (91) being connected to an input of an AND-gate (92), a further input of which is connected to the input of the control circuit (58), an output of the gate (92) being coupled to the switch (98) via a delay circuit (93).

* * * * *